United States Patent Office 3,101,364
Patented Aug. 20, 1963

3,101,364
BETA CARBAMYLVINYL PHOSPHATE NEUTRAL TRIESTERS
Loyal F. Ward, Jr., and Alan R. Stiles, Modesto, Calif., assignors to Shell Oil Company, New York, N.Y., a corporation of Delaware
No Drawing. Filed June 26, 1961, Ser. No. 119,290
5 Claims. (Cl. 260—461)

This invention relates to a new class of phosphorus-containing esters which have been found to be particularly useful as insecticides.

The requirements for useful insecticides vary depending upon the kind of application intended. To be successful, an insecticide must, of course, be toxic to the insect to be controlled. For some applications, it is desirable that it be stable and have extended residual activity; for other applications, it is desirable that its useful life be short. For use by unskilled personnel, it should be relatively nontoxic to mammals; in other cases, particularly where it is to be applied only by skilled personnel, the mammalian toxicity is less of a factor. Of course, where the insecticide is to be applied to the foliage or roots of plants, or to soil in which the plant is growing, it must be nonphytotoxic, at least at the insecticidal dosage. Further, in many instances, it is desirable that an insecticide be one which can be absorbed into the plant, disseminating in the plant and killing insects which feed upon the plant—i.e., it may be desirable that the insecticide be one which is denoted as "systemic."

This invention is a novel class of organophosphorus esters of which individual members exhibit a variety of properties—some being systemic, others not; some being much less toxic to mammals than others; some being quite residual, others having short life; all, however, being effective insecticides against a variety of insects and all being non-phytotoxic at the insecticidal dosages.

The compounds of this invention can be described by the general formula:

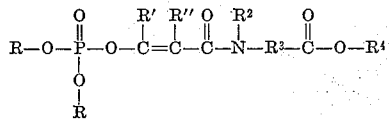

wherein R is lower hydrocarbon or lower substituted hydrocarbon, R' and R'' is each hydrogen, middle halogen, lower hydrocarbon or lower substituted hydrocarbon, R² is hydrogen, lower hydrocarbon or lower substituted hydrocarbon, R³ is alkylene and R⁴ is lower hydrocarbon or lower substituted hydrocarbon.

The organic groups represented by R, R', R'', R² and R⁴ can be aliphatic, cycloaliphatic, aromatic or mixed hydrocarbon groups. When aliphatic, they can be either straight-chain or branched-chain configuration, and may be saturated or olefinically unsaturated. Type-wise, the suitable hydrocarbon groups include alkyl, alkenyl, cycloalkyl, aryl, aralkyl, alkaryl, and the like. The groups represented by these symbols are preferably free from acetylenic unsaturation, since starting materials from which compounds of the invention containing one or more acetylenic groups could be prepared are not readily available, or easily prepared. Illustrative examples of the groups represented by these symbols include the methyl, ethyl, n- and isopropyl groups, the various isomeric butyl, pentyl, hexyl, octyl, nonyl and like alkyl groups; the cyclopentyl, cyclohexyl and like cycloalkyl groups; the allyl group, the crotyl group, and like alkenyl groups; the phenyl group; the naphthyl group; the benzyl, phenethyl, p-methylbenzyl alpha-methylbenzyl and like aralkyl groups; the isomeric xylyl groups; the ethylphenyl groups; the 2,4- and 3,5-dimethylphenyl groups, and like alkaryl groups, and the like. Preferably the groups represented by R, R', R'', R² and R⁴ each contains not more than 10 carbon atoms, and is alkyl, or is mononuclear aryl, alkaryl or aralkyl.

The groups R, R', R'', R² and R⁴ suitably can be substituted hydrocarbon groups, by which is meant the above-mentioned hydrocarbon groups substituted by one or more non-hydrocarbon substituents. The preferred substituents are halogen, particularly the middle halogens bromine and chlorine; the nitro group; the cyano group; and amino groups as hereinafter defined. Illustrative examples include: the chloromethyl group, the dichloromethyl group, the 3-chloroethyl, 1-bromopropyl, 3-bromopropyl groups and the like; the 1,2-dichloroethyl, 2,2-dibromo, 3,3-dichloro-2-bromopropyl, trichloromethyl, dibromomethyl, and like groups, nitroalkyl groups such as the 2-nitroethyl group; halo-substituted aromatic groups, such as the various isomeric chloro- and bromophenyl groups, the various isomeric polyhalophenyl groups, such as the 2,4- and 2,6-dichlorophenyl groups, the 3,5-dibromophenyl group, and the like; amino-substituted groups, such as the 2-aminoethyl group, the 3-dimethylaminopropyl group and the like; the anilino group; the p-dimethylaminobenzyl group, and the like.

As used herein, the term "amino" is intended to include all of the amino groups defined by the formula:

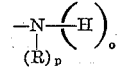

wherein R has the meaning already set out herein, $o=0$, 1 or 2, and $o+p=2$, with the proviso that when $p=2$, both of the groups R together can form a divalent group, preferably an alkylene or alkyleneoxy-alkylene group of up to 10 carbon atoms with from 4 to 5 carbon atoms in the chain thereof which together with the indicated nitrogen atom forms a heterocyclic ring, as for example, in a pyridyl ring or a morpholino ring.

The compounds of this invention are derivatives of amino-carboxylic acids, and consequently, the group R³ is an alkylene group. Thus, in compounds of this invention which are derivatives of alpha-aminocarboxylic acids, the group R³ is the methylene group, or is an alkylidene group, with but one carbon atom bonding the nitrogen atom and the carbonyl group. In compounds of this invention which are derivatives of aminocarboxylic acids wherein the amino group is bonded to a carbon atom other than that in the alpha position relative to the carboxyl group, the group R³ contains more than one carbon atom in the chain which bonds the nitrogen atom to the carboxyl group; further, the group R³ in such a case can be either straight-chain or branched-chain in configuration. The group R³ can be a substituted alkylene group, as for example, the compounds of the invention which are derivatives of naturally occurring aminocarboxylicacids—substituents including hydroxyl, mercapto (RS—), amino, hydrocarbon such as benzyl, phenyl, substituted benzyl, substituted phenyl, and the like. Where substituted, the substituent group(s) is (are) bonded through methylene or other alkylene to a carbon atom or atoms in the chain joining the nitrogen atom to the carbonyl group. Because of the properties thereof, it appears that those compounds of the invention derived from alpha-aminocarboxylic acids are to be preferred, and of these, those wherein the group R³ is hydrocarbon are to be more preferred.

In terms of their antecedent aminocarboxylic acids, typical examples of the group R³ include the groups R³ of such aminocarboxylic acids as glycine, alanine, serine, 6-aminohexane-1-carboxylic acid, omega-aminocaproic acid, omega-aminovaleric acid, 4-amino-1-methyl-valeric acid, 3-aminocaproic acid, 3-aminovaleric acid, omega-aminobutyric acid, beta-aminovaleric acid, beta-aminobutyric acid, beta-alanine, alpha-aminobutyric acid, threonine, valine, norvaline, leucine, isoleucine, citrulline, phenylalanine and the like.

In the compounds of this invention containing halogen, it is preferred that the halogen be a middle halogen—that is, bromine or chlorine—because of the desirable properties of those compounds.

To further illustrate and demonstrate the character of the compounds of this invention, the following species thereof are set forth. It will be appreciated that in the cases of many of these compounds, their names, following the rules of chemical nomenclature, are complicated and cumbersome, and the structure of the compound—the nature of the substituents and their respective positions—is not readily evident from the name. Consequently, and to show clearly the nature of each substituent group, and its position in the molcule, these species are being named by seting forth the generic structure, indicating each substituent and its position in the molecule by a symbol, and then identifying the substituent in each case in the following table.

The formula:

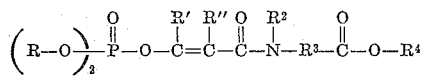

carbon atoms and $R^x$ represents hydrogen or alkyl of from 1 to 4 carbon atoms. Optimum properties appear to be possessed by those of this subgenus wherein alkyl bonded to carbon is methyl, $R^x$ is hydrogen, and alkylidene is methylene.

The compounds of this invention are readily prepared by bringing together an alkyl ester of an acid of trivalent phosphorus and an alpha-halo-substituted carbonyl compound of the formula:

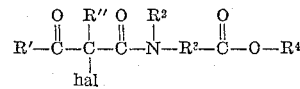

wherein hal represents middle halogen, and the other symbols have the respective meanings already designated. The subgenus of the compounds of the invention designated by formula III are, of course, prepared from the alpha-middle-halocarbonyl compounds of the formula:

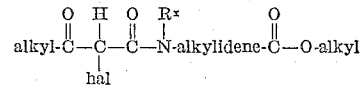

wherein the symbols have the respective meanings already set out, particular members having optimum properties being prepared from these alpha-halocarbonyl compounds

TABLE I

| Species Number | R | R | R' | R'' | $R^2$ | $R^3$ | $R^4$ |
|---|---|---|---|---|---|---|---|
| 1 | methyl | methyl | methyl | H | H | methylene | methyl. |
| 2 | do | ethyl | H | methyl | H | do | Do. |
| 3 | ethyl | do | methyl | H | methyl | do | ethyl. |
| 4 | propyl | propyl | H | H | H | do | methyl. |
| 5 | methyl | methyl | methyl | H | phenyl | do | Do. |
| 6 | chloromethyl | chloromethyl | do | H | H | do | Do. |
| 7 | methyl | methyl | do | H | H | do | phenyl. |
| 8 | do | do | do | H | H | do | benzyl. |
| 9 | isopropyl | isopropyl | H | phenyl | H | ethylene | p-chlorophenyl. |
| 10 | methyl | methyl | methyl | dimethylamino | H | methylene | methyl. |
| 11 | do | do | do | H | H | ethylidene | Do. |
| 12 | 2-chloroethyl | 2-chloroethyl | do | H | H | methylene | Do. |
| 13 | butyl | butyl | do | H | H | do | Do. |
| 14 | methyl | methyl | H | H | H | benzylidene | Do. |
| 15 | do | do | phenyl | H | H | methylene | Do. |
| 16 | do | do | p-chlorophenyl | H | H | do | Do. |
| 17 | do | do | methyl | methyl | H | do | Do. |
| 18 | ethyl | ethyl | do | H | benzyl | do | Do. |
| 19 | methyl | methyl | do | H | H | do | chloromethyl. |
| 20 | do | phenyl | do | H | H | do | methyl. |
| 21 | do | benzyl | do | H | H | do | Do. |
| 22 | do | alpha-methyl-benzyl. | do | H | H | do | Do. |
| 23 | do | 2,4-dichlorophenyl. | do | H | H | do | Do. |
| 24 | do | p-(dimethylamino)phenyl. | do | H | H | do | Do. |

Because of their properties, preferred compounds of the invention wherein $R^4$ and one or more of R', R'' and $R^2$ are organic, are those wherein R', R'', $R^2$ and/or $R^4$ are alkyl or haloalkyl of from 1 to 6 carbon atoms, mononuclear aryl of up to 10 carbon atoms, mononuclear aralkyl of up to 10 carbon atoms, these aryl and aralkyl groups substituted by nitro and/or cyano and/or middle halogen; particularly the phenyl group, the benzyl group, the nitrophenyl groups, the cyanophenyl groups, the mono- and dichlorophenyl groups, and the nitro-, cyano- and mono- and dichlorobenzyl groups.

In the compounds of the invention containing one or more amino groups, it is preferred that the amino group, or each of the amino groups, be low molecular weight, containing up to 10 carbon atoms, and is the amino ($-NH_2$), or a mono- or dialkylamino group.

A subgenus of the compounds of the invention which appears to have desirable insecticidal properties is that described by the formula:

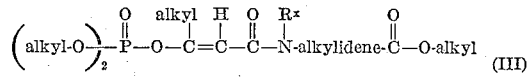

wherein "alkyl" represents alkyl of from 1 to 4 carbon atoms, "alkylidene" represents alkylidene of from 1 to 4 wherein alkyl bonded to carbon is methyl, $R^x$ is hydrogen and alkylidene is methylene.

The halocarbonyl reactants can be prepared by halogenating the corresponding carbonyl compounds with a sulfuryl halide such as sulfuryl chloride according to the method described by Macbeth et al., 127, J. Chem. Soc., 1118–1122 (1925). The carbonyl compounds are in many cases known compounds, and methods for their preparation is described in U.S. Patent No. 2,660,583 and in J. Chem. Soc., 1954, 850.

The suitable phosphorus reactants are the phosphites containing at least one lower alkyl group, having the formula:

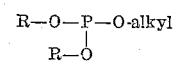

wherein "alkyl" is alkyl from 1 to 4 carbon atoms, preferably methyl or ethyl, and R has the meaning already assigned.

The reaction between the halocarbonyl reactant and the phosphite reactant is effected by slowly mixing about an equimolar amount of the phosphite with the halocarbonyl reactant, the temperature being controlled either by heating or by cooling as necessary to maintain the reaction temperature within the range of from about 60° C. to about 150° C. The by-product alkyl halide may be removed from the reaction zone as it is formed by adjusting the pressure in the reaction system so that the alkyl halide volatilizes while the product phosphate and the reactants do not. However, in some cases the boiling point of the alkyl halide by-product will be fairly close to the boiling point of the halocarbonyl reactant, so that such a technique is undesirable; in such cases, the formed alkyl halide is most conveniently allowed to remain in the reaction zone until the desired reaction is substantially complete and then is removed together with any unreacted halocarbonyl reactant by distillation of the reaction mixture under reduced pressure. Some of the higher molecular weight reactants and reaction products are solids at ordinary temperatures; in these cases use of an inert solvent such as xylene insures a fluid reaction system. To insure complete reaction between the phosphite and the halocarbonyl reactant, the reaction mixture is heated for a reasonable time—e.g., from about one hour to about six hours—after addition of all of the phosphite.

The phosphate product can be recovered by distillation under sufficiently low pressure that thermal decomposition of the product is avoided. With the higher molecular weight products, however, it is often convenient to recover the phosphate by crystallization or by molecular distillation. Where the desired product has the highest boiling point of any component in the crude reaction mixture, the product can in some cases be obtained by merely stripping off the lower boiling materials to recover the product as residue.

Because of the reactivity of the various compounds involved, it is usually necessary to exclude water from the reaction and work-up zones.

Preparation of typical members of the compounds of this invention is described in the following examples. These examples are intended to be illustrative and exemplary in character only, and are not to be considered as limiting the invention in any way. In these examples, the relationship between "parts by weight" and "parts by volume" is the same as the relationship between the kilogram and the liter.

*Example I.—Preparation of N-(3-(Dimethoxyphosphinyloxy)Crotonoyl)Glycine Ethyl Ester*

(a) PREPARATION OF N-ACETOACETYLGLYCINE ETHYL ESTER 510 parts by weight of the hydrogen chloride salt of glycine ethyl ester was dissolved in 1500 parts by volume of ice-water and treated with 307 parts by weight of sodium bicarbonate in small portions over a 30-minute period, maintaining the temperature of the mixture at 0–5° C. 307 parts by weight of diketene then was added over a 1-hour period, the mixture temperature being maintained at 5–10° C. The mixture then was warmed to 50° C., requiring 40 minutes, then cooled, saturated with sodium chloride and extracted with methylene dichloride. The methylene dichloride solution was dried with magnesium sulfate, filered and allowed to stand at room temperature overnight. The solvent then was stripped off under water aspirator vacuum to a pot temperature of 80° C. The residue was stripped in a molecular still at 65–70° C. and 0.001 millimeter mercury pressure. The stripped material then was crystallized from a mixture of equal volumes of methanol and diethyl ether, to yield N-acetoacetylglycine ethyl ester, melting at 56.6–57.5° C. Identity of the product was confirmed by elemental analysis:

Calculated: C, 51.4; H, 7.0; N, 7.5. Found: C, 51.0; H, 7.5; N, 7.4.

(b) PREPARATION OF N-2-CHLOROACETOACETYL- GLYCINE ETHYL ESTER 512 parts by weight of N-acetoacetylglycine ethyl ester in 500 parts by volume of methylene dichloride was treated over a 1-hour period with 211 parts by volume of sulfuryl chloride in 211 parts by volume of methylene dichloride, the mixture being maintained at 5–10° C. The mixture then was heated to reflux (42° C.) for 30 minutes, cooled, washed with sodium carbonate solution, dried with magnesium sulfate and stripped of solvent under water aspirator vacuum to 80° C. The product was identified as N-2-chloroacetoacetylglycine ethyl ester by elemental analysis and infrared spectrum analysis.

(c) PREPARATION OF N-(3-(DIMETHOXYPHOSPHINYL- OXY)CROTONOYL)GLYCINE ETHYL ESTER 425 parts by weight of N-2-chloroacetoacetylglycine ethyl ester was stirred in a flask at 85° C. 276 parts by weight of trimethyl phosphite was added dropwise over a 3-hour period, the temperature of the mixture being maintained at 90–100° C. The mixture then was stirred for 15 minutes at 85–95° C. while the pressure was reduced to 150–200 millimeters mercury. The residue was stripper for 1 hour at 75–80° C. and 20–25 millimeters mercury pressure, then for 1 hour at 80–90° C. and about 1 millimeter mercury pressure. The residue then was distilled at 135–138° C. and 0.001 millimeter mercury pressure to yield N-(3-(dimethoxyphosphinyloxy)crotonoyl)glycine ethyl ester. Identification of the product was confirmed by elemental analysis and infrared spectrum analysis.

*Example II.—Preparation of N-(3-(Methoxyphenoxy- phosphinyloxy)Crotonoyl)Glycine Ethyl Ester*

23.7 parts by weight of dimethyl phenyl phosphite was added slowly to 28 parts by weight of N-2-chloroaceto- acetylglycine ethyl ester held at 85–95° C. The addition required 30 minutes. The mixture was then held at 85–95° C. for an additional 2.5 hours, then was stripped at 90–95° C. and 0.001 millimeter mercury pressure, to yield N-(3-(methoxyphenoxyphosphinyloxy)cro- tonoyl)glycine ethyl ester, identified by elemental analysis.

*Example III.—Preparation of N-(3-(Dimethoxyphos- phinyloxy)Crotonoyl)Glycine Methyl Ester*

N-2-chloroacetoacetylglycine methyl ester was prepared from the methyl ester of glycine in the manner described for the ethyl ester in parts a and b, Example I.

34.1 parts by weight of trimethyl phosphite was added to 52 parts by weight of the methyl ester over a period of 10 minutes, the temperature of the mixture being allowed to rise from 25° C. to about 45° C., where it was maintained. The mixture then was held at 45° C. for an additional 10 minutes, then heated to and held at 55° C. for 2 hours. The mixture then was distilled on the molecular still at 150° C. and 0.001 millimeter mercury pressure to yield N-(3-(dimethoxyphosphinyl- oxy)crotonoyl)glycine methyl ester, identified by elemental analysis and infrared spectrum analysis.

Compounds of this invention are promising insecticides, being active against a variety of insects, stable on storage, non-phytotoxic at insecticidally effective dosages, show systemic activity and relatively non-toxic to mammals.

By the term "insects" is meant not only the members of the class Insecta, but also related or similar invertebrate animal organisms belonging to the allied classes of arthropods and including ticks, mites, spiders, wood lice and the like. The compounds of this invention have been found to be outstandingly effective against mosquitoes.

Compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ and $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the insecticides of the present invention can be employed as aerosols, as by dispersing the same into the atmosphere by means of a compressed gas.

The concentration of the insecticides to be used with the above carriers is dependent upon many factors, including the particular insecticide utilized, the carrier employed, the method and conditions of application, and the insect species to be controlled, a proper consideration and resolution of these factors being within the skill of those versed in the insecticide art. In general, however, the insecticide compounds of this invention are effective in concentrations of from about 0.01 to 0.5% based upon the total weight of the composition, though under some circumstances as little as about 0.00001% or as much as 2% or even more of the compound can be employed with good results from an insecticidal standpoint, as wherein high concentrations of active material are used in low-volume sprays or dusts.

When employed as an insecticide, a compound of this invention can be employed either as the sole toxic ingredient or the insecticidal composition, or it can be employed in conjunction with the other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, dimethyl 2,2-dichlorovinyl phosphate, dimethyl 1,2-dibromo-2,2-dichloroethyl phosphate, and the various compounds of arsensic lead and/or fluorine.

The promise of compounds of this invention as insecticides is demonstrated by the following experiments and the results thereof.

*Example IV*

Solutions of certain of the novel compounds of the invention were made up employing either a neutral petroleum distillate boiling within the kerosene range or acetone as the solvent. The solutions were tested for toxicity against the two-spotted spider mite, *Tetranychus telarius*, and the pea aphid, *Macrosiphum pisi*, by spraying the groups of plants infested with the insects under controlled conditions which varied from one test to the other only with respect to the identity of the toxic agent and its concentration. Thus, in each of the several tests, the same total volume of spray was used. Also, tests were carried out using the common housefly, *Musca domestica*, as the test insect, the method used being that described by Y. P. Sun, Journal of Economic Entomology, volume 43, pp. 45 et seq. (1950). Table II shows the concentration of toxic agent in the sprayed solution required to cause 50 percent mortality of the test insect—i.e., the $LC_{50}$ concentration.

TABLE II

Medium lethal concentration ($LC_{50}$) (grams per 100 milliliters solvent

| Test Material | Test Insect | | |
|---|---|---|---|
| | Pea Aphid | Two-spotted Spider Mite | Housefly |
| N-(3-dimethoxyphoxphinyloxy)-crotonoyl)glycine ethyl ester | 0.000081 | 0.042 | 0.022 |
| N-(3-dimethoxyphoxphinyloxy)-crotonoyl)glycine methyl ester | 0.000134 | 0.013 | 0.048 |

*Example V*

The systemic properties of insecticides of this invention were demonstrated as follows: Solutions of the active agents in acetone (containing 1% of the active agents) were diluted with water to yield the desired concentration. Young growing pinto bean plants infested with mites were carefully removed from the soil, the roots washed with water, the roots carefully immersed in the test solution in a glass flask, and the flask stoppered with cotton around the stems of the plants. Mortality readings were taken after 48 hours. The following table (Table III) sets out the concentration of the active agent in the test solution required to kill 50% of the insects on the infested plant upon 48 hours' immersion of the roots of the plant in the solution:

TABLE III

| Agent | Concentration (p.p.m.) for 50% kill of mites |
|---|---|
| N-(3-dimethoxyphosphinyloxy)-crotonoyl)glycine ethyl ester | 25 |

*Example VI*

The residual activity as insecticides of compounds of this invention was determined as follows:

Aqueous formulations of the compounds were sprayed in uniform fashion on two primary leaves of potted pinto bean plants by rotating the plants on a turntable while applying the spray. Mite eggs were present on the plants when the spray applications were made. Percent reduction of the mites on the sprayed plants from those on untreated plants was calculated seven days after spraying.

TABLE IV

| Agent | Concentration (percent by wt. of agent in solvent) | Percent mite reduction compared to check |
|---|---|---|
| N-(3-dimethoxyphosphinyloxy)-crotonoyl)-glycine ethyl ester | 0.3 | 100 |
| N-(3-dimethoxyphosphinyloxy)-crotonoyl)-glycine methyl ester | 0.1 | 100 |

Further, in a special test, it was found that the latter compound killed mites for at least a week when an emulsion of the compound was poured into the surface of soil in which pinto bean plants, infested with mites, were growing.

*Example VII*

During the conduct of these insecticidal tests, there was observed no phytotoxicity of the insecticides at the concentrations used.

*Example VIII*

It has been found that the oral mammalian toxicity ($LD_{50}$ in milligrams per kilogram of body weight) of N-(3-dimethoxyphosphinyloxy)-crotonoyl)glycine ethyl ester to mice is relatively low, the $LD_{50}$ being 307.

We claim as our invention:

1. As a novel compound, a phosphorus ester of the formula:

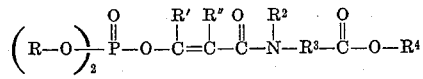

wherein R and $R^4$ each is a member of the group consisting of non-acetylenic lower hydrocarbon and non-acetylenic mono-substituted lower hydrocarbon wherein said substituent is selected from the group consisting of middle halogen, nitro, cyano and amino, R' and R" each is a member of the group consisting of hydrogen, middle halogen and R, $R^2$ is a member of the group consisting of hydrogen and R, $R^3$ is lower alkylene, each of said R, R', R", $R^2$ and $R^4$ groups containing from 1 to 10 carbon atoms.

2. As a novel compound, a phosphorus ester of the formula:

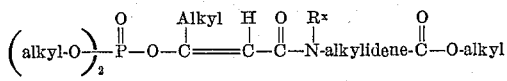

wherein "alkyl" is alkyl from 1 to 4 carbon atoms, "alkylidene" is alkylidene of from 1 to 4 carbon atoms and $R^x$ represents a member of the group consisting of hydrogen and alkyl of from 1 to 4 carbon atoms.

3. As a novel compound, a phosphorus ester of the formula:

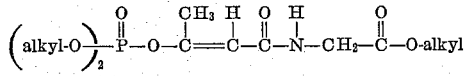

wherein "alkyl" is alkyl from 1 to 4 carbon atoms.

4. N - (3 - dimethoxyphosphinyloxy)crotonoyl)glycine ethyl ester.

5. N - (3 - (dimethoxyphosphinyloxy)crotonoyl)glycine methyl ester.

References Cited in the file of this patent
UNITED STATES PATENTS

| | | |
|---|---|---|
| 2,802,855 | Whetstone et al. | Aug. 13, 1957 |
| 2,943,975 | Metivier | July 5, 1960 |